Dec. 24, 1968   P. D. JONES ET AL   3,418,633
PULSE TIME INTERVAL MEASURING SYSTEM
Filed Jan. 14, 1965   14 Sheets-Sheet 1

INVENTORS
PHILIP D. JONES
BILLY G. WOOD
BY
AGENT

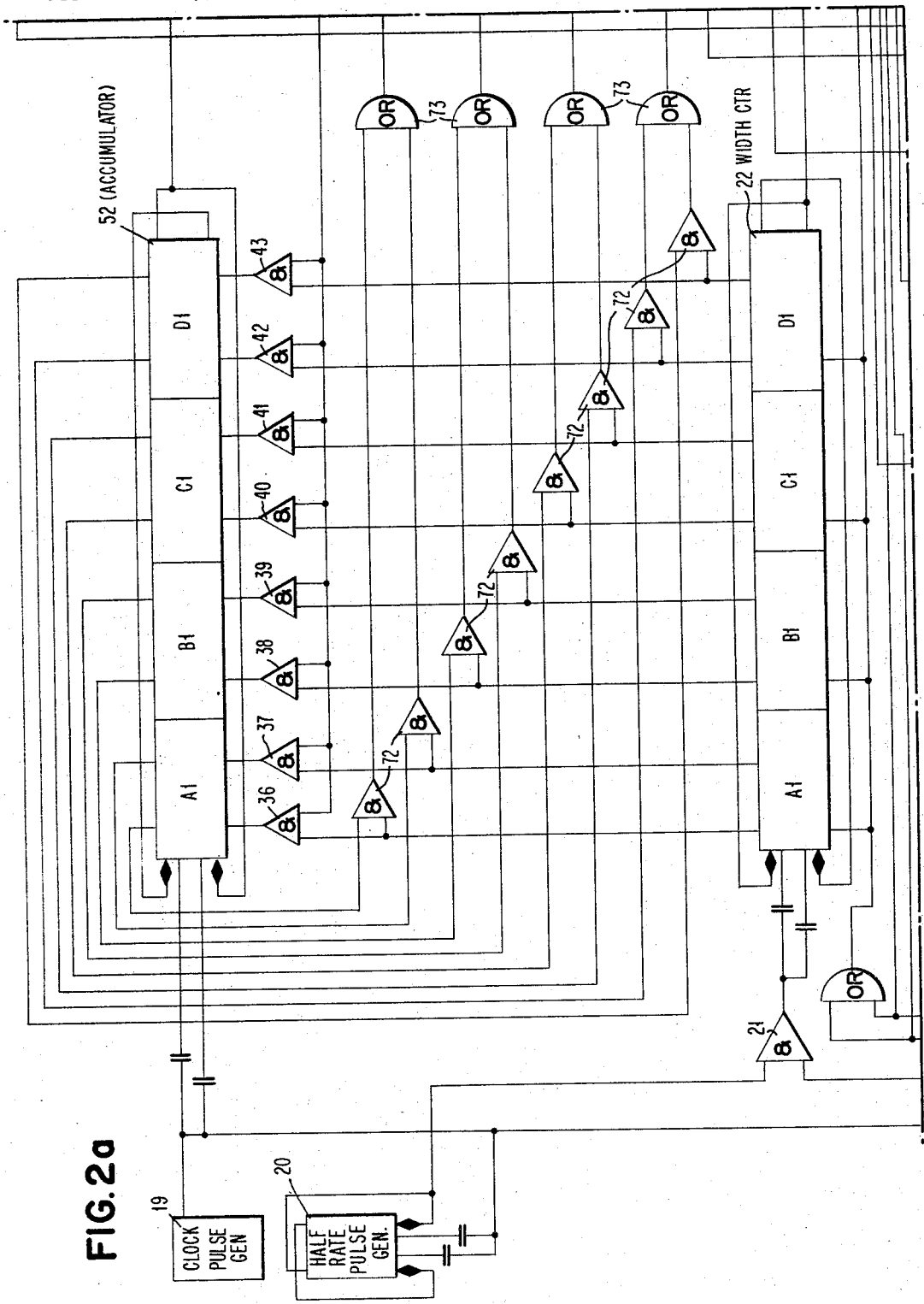

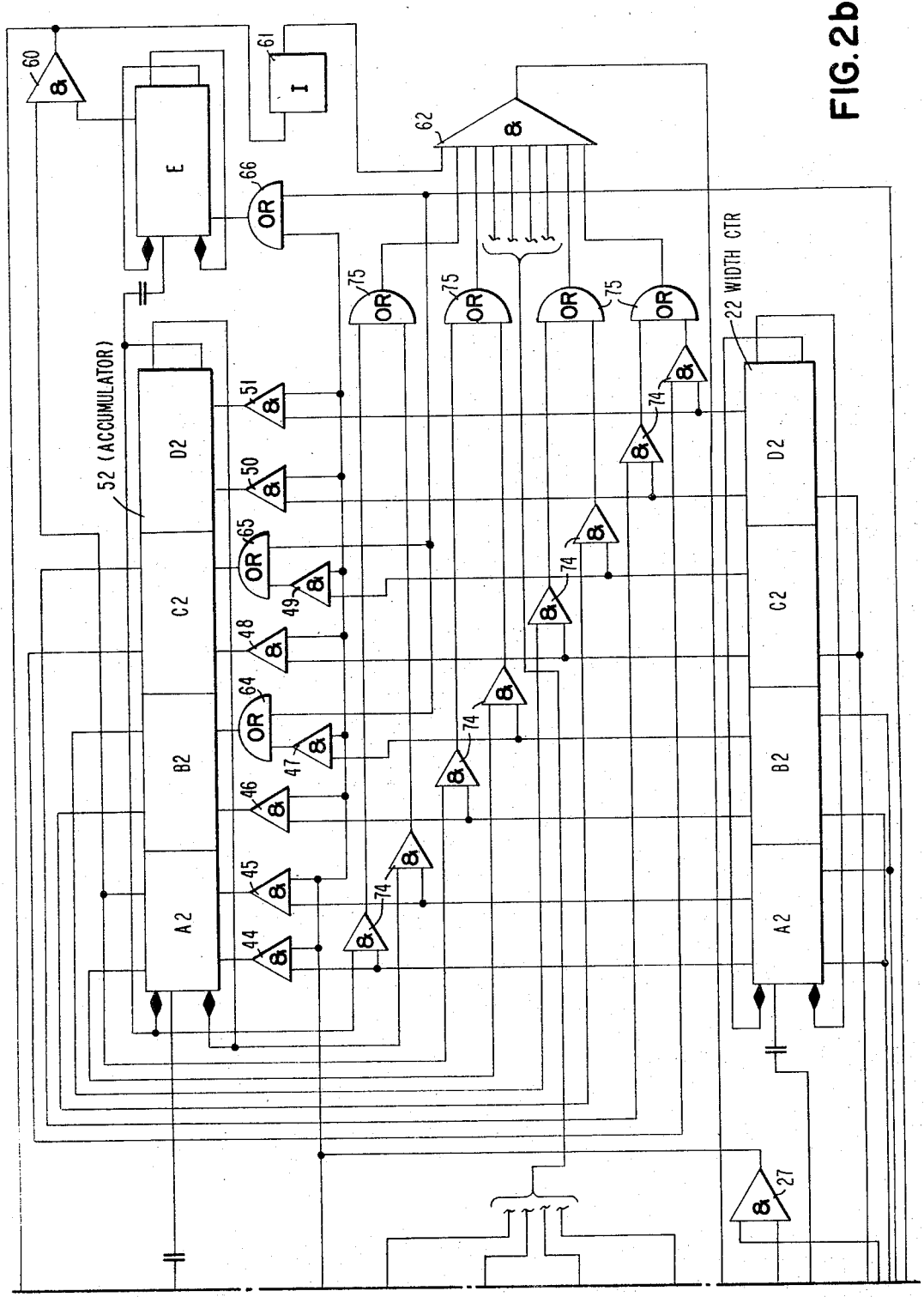

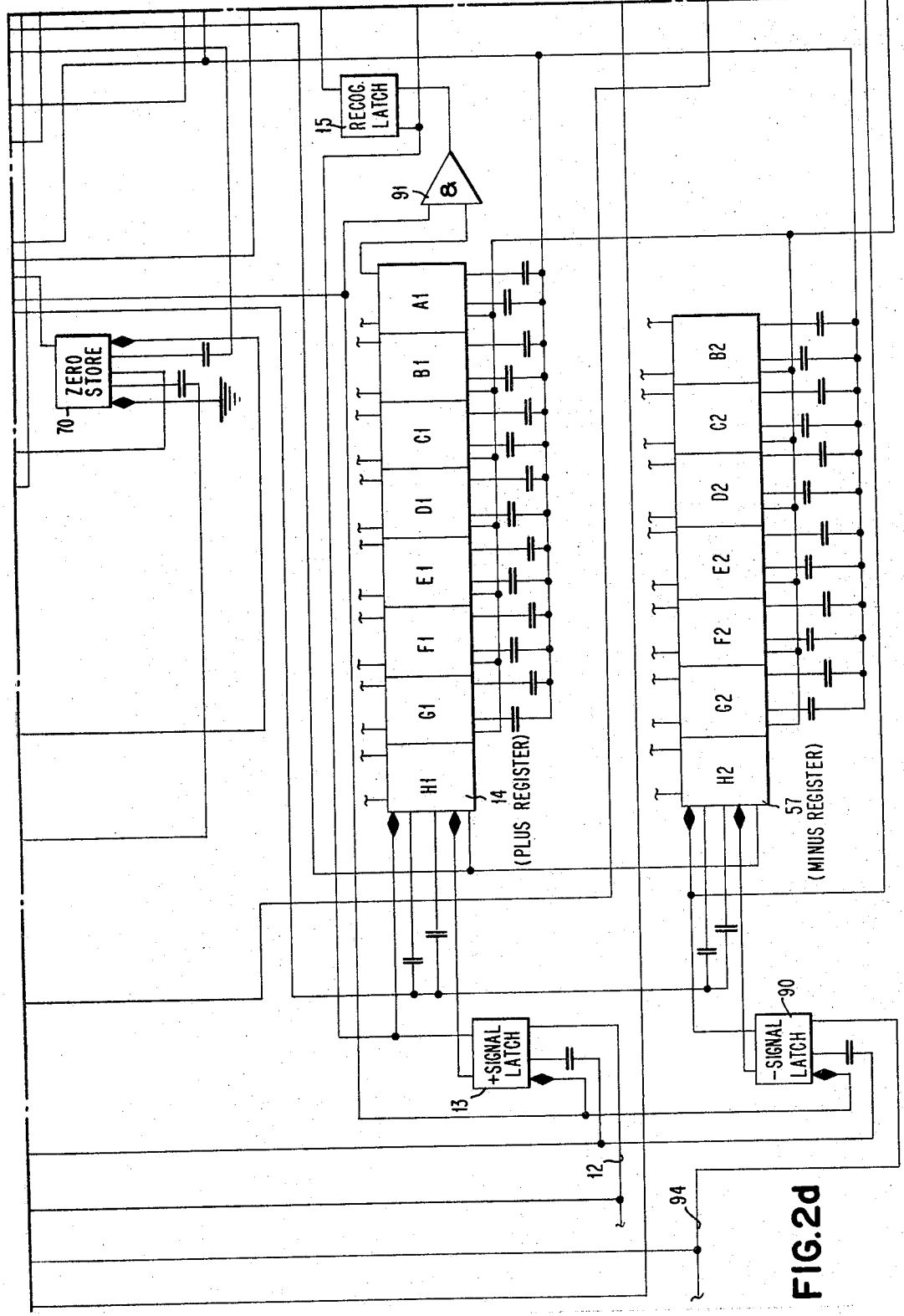

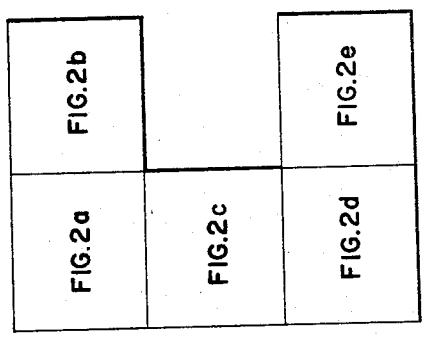
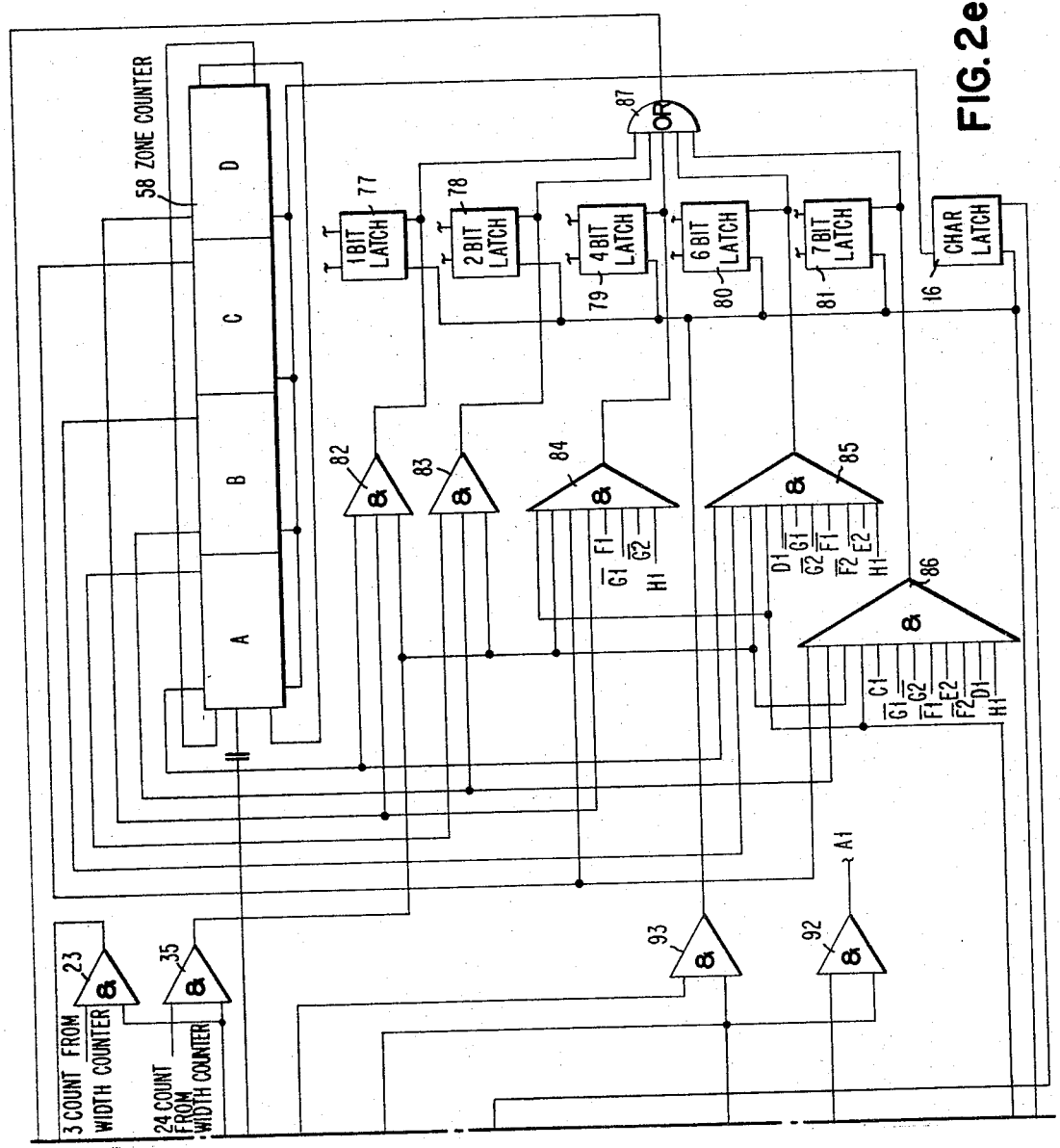

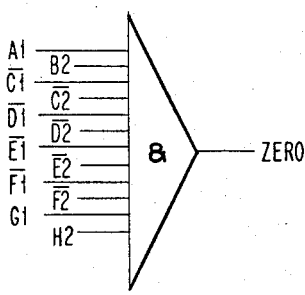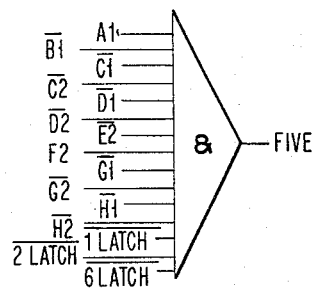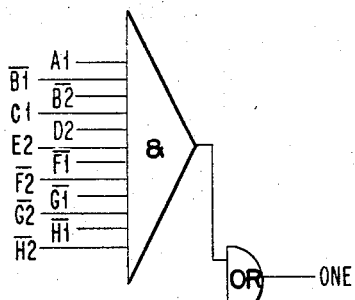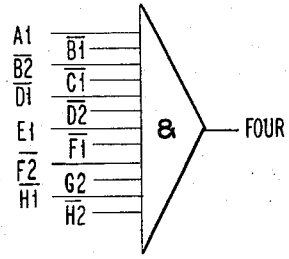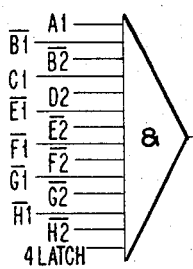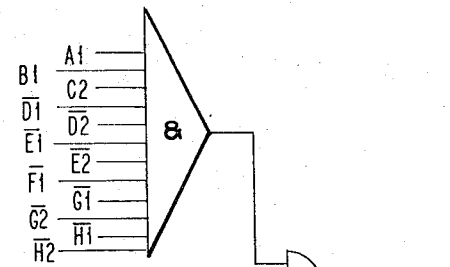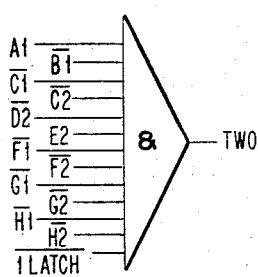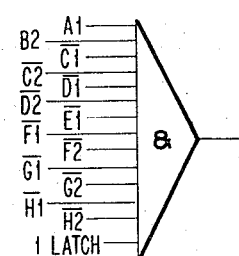
FIG. 4a

FIG. 5

CHARACTER RECOGNITION STATEMENTS

| REGISTER POSITION | A | B | C | D | E | F | G | H | 1 BIT LATCH | 2 BIT LATCH | 4 BIT LATCH | 6 BIT LATCH | 7 BIT LATCH |
|---|---|---|---|---|---|---|---|---|---|---|---|---|---|
| ZONES | 1 | 2 | 3 | 4 | 5 | 6 | 7 | 8 | | | | | |
| 0 | + | − | o | o | o | o | + | − | | | | | |
| 1 | + | o | + | − | − | o | o | o | | | | | |
| 1 | + | o | + | − | o | o | o | o | | | Y | | |
| 2 | + | $\frac{-}{o}$ | o | $\frac{+}{o}$ | − | o | o | o | N | | | | |
| 3 | + | + | − | o | o | $\overline{o}$ | o | o | | | | | |
| 3 | + | − | o | o | $\overline{o}$ | o | o | o | Y | | | | |
| 4 | + | o | $\overline{o}$ | o | + | o | − | o | | | | | |
| 5 | + | $\frac{-}{o}$ | o | o | $\frac{+}{o}$ | − | o | o | N | N | | N | |
| 6 | + | $\frac{-}{o}$ | $\frac{+}{o}$ | $\frac{-}{o}$ | o | + | − | o | | | | | |
| 7 | + | $\frac{-}{o}$ | + | − | $\frac{+}{o}$ | $\frac{-}{o}$ | o | o | | N | | | |
| 8 | + | + | − | o | o | + | − | − | | | | | |
| 8 | + | − | o | o | + | − | − | o | Y | | | | |
| 8 | + | + | − | o | o | + | − | o | | | | | Y |
| 8 | + | − | o | o | + | − | o | o | Y | | | Y | |
| 9 | + | $\overline{o}$ | − | o | o | $\frac{+}{o}$ | − | o | | | | | |
| 9 | + | − | o | o | $\frac{+}{o}$ | − | o | o | | Y | | N | |
| TRAN-SIT | + | o | o | − | o | + | o | − | | | | | |
| AMT. | + | o | − | + | − | + | o | − | | | | | |
| ON US | + | o | o | − | + | − | + | − | | | | | |
| DASH | + | − | + | o | − | + | o | − | | | | | |

| COUNT | $A_1$ | $B_1$ | $C_1$ | $D_1$ | $A_2$ | $B_2$ |
|---|---|---|---|---|---|---|
| 0 | 0 | 0 | 0 | 0 | 0 | 0 |
| 1 | 1 | 0 | 0 | 0 | 0 | 0 |
| 2 | 1 | 1 | 0 | 0 | 0 | 0 |
| 3 | 1 | 1 | 1 | 0 | 0 | 0 |
| 4 | 1 | 1 | 1 | 1 | 0 | 0 |
| 5 | 0 | 1 | 1 | 1 | 0 | 0 |
| 6 | 0 | 0 | 1 | 1 | 0 | 0 |
| 7 | 0 | 0 | 0 | 1 | 0 | 0 |
| 8 | 0 | 0 | 0 | 0 | 1 | 0 |
| 9 | 1 | 0 | 0 | 0 | 1 | 0 |

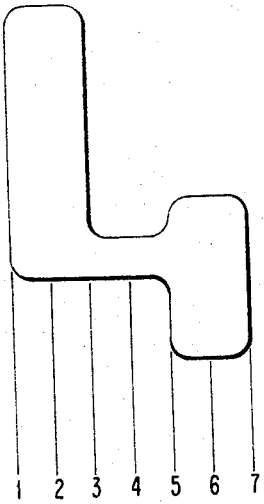
FIG. 9a
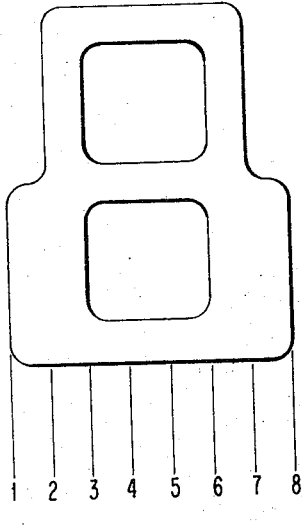
FIG. 9b
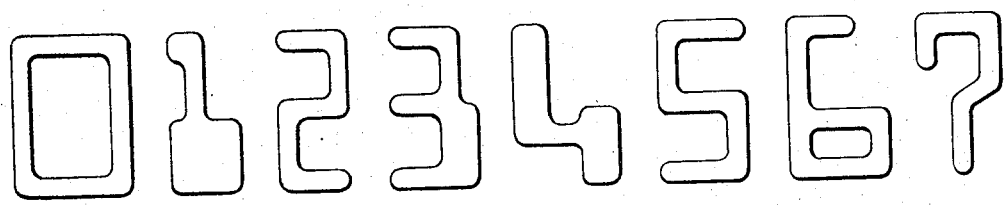
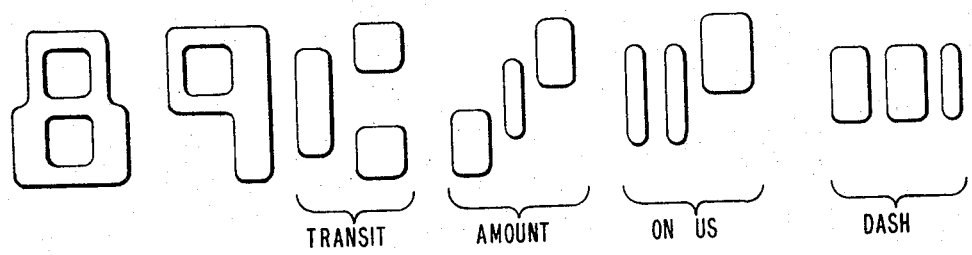
FIG. 9c 3,418,633
Patented Dec. 24, 1968

3,418,633
PULSE TIME INTERVAL MEASURING SYSTEM
Philip D. Jones, Vestal, N.Y., and Billy G. Wood, Phoenix, Ariz., assignors to International Business Machines Corporation, New York, N.Y., a corporation of New York
Filed Jan. 14, 1965, Ser. No. 425,478
10 Claims. (Cl. 340—146.3)

ABSTRACT OF THE DISCLOSURE

A pulse time interval measuring system for determining the sequence and time separation of character-representing pulses in a character recognition system in which the characters are recorded with magnetic ink. The data can be read by passing each character successively under a magnetic reading head. The output of the reading head produces a resultant wave shape which is uniquely characteristic for each different character. The output of the reading head is passed through a quantizer with output bit signals therefrom occurring at different times with respect to a reference starting time. The bit signals serve to gate the output of pulse generating circuitry for application to pulse width analyzing circuitry for determining the presence or absence of bit signals at predetermined times, and with an output therefrom being insertable into multi-level shift registers. The bit signals also serve to controllably gate the input to shift registers. The outputs of the shift registers are representative of a character stored therein and are applied to a coincident circuit arrangement for encoding and transmission to automatic data processing equipment.

---

This invention relates to a pulse time interval measuring system and, more particularly, to an improved pulse time interval measuring system for determining the sequence and time separation of character representing pulses.

Various methods and arrangements for the identification of printed characters are already known. In some of these methods the characters are scanned along certain lines and the transitions from the character field to the character or conversely are determined for the evaluation purpose. In other methods, the scanning field is divided into a scanning raster and each of the raster components is examined with respect to the black and white portions of the characters. With all of the conventional methods, the scanning operation may be accomplished either optically or magnetically depending on how the characters are arranged and recorded on the record medium. In order that it may be possible for the scanning results, which finally exist as electrical signals, to be assigned to the characters to be identified, it is necessary in most cases to provide a storage device, in which the incoming signals are at first stored and from there applied to an evaluating configuration.

In an application for a pulse time interval measuring system by Billy G. Wood, Ser. No. 269,537, filed Apr. 1, 1963, now U.S. Patent 3,278,900, which is assigned to a common assignee, there is described and claimed an apparatus and system for measuring and determining the sequence and time separation of character representing pulses. Briefly described, this system includes an arrangement for analyzing character representing waveforms, which are uniquely characteristic for each different character, with respect to a starting point for each character. The output representations are adapted for use by utilization means.

The subject matter of the present invention concerns the improvements in the apparatus and system of the above-identified application for the automatic identification of characters in character recognition systems of the type in which the vertical edges of the characters to be recognized are utilized as at least one criteria of the identification of the character. The characters to be recognized are sliced vertically into a plurality of adjacent zones. Information which may be useful in determining the character is the leading and trailing edges of the vertical contour of the character. To obtain this information, it is necessary to determine, with respect to a suitable datum, such as the starting point of the first character zone the relative times of occurrence of intercept with the leading and trailing edge of the character contours.

Accordingly, a principal object of this invention is to provide an improved pulse time interval measuring system.

Another object of the invention is to provide an improved pulse time interval measuring system for detecting the relative times of occurrence of a succession of distinctive events.

Still another object of the invention is to provide an improved pulse time interval measuring system which is capable of quantitatively distinguishing between the relative time of occurrence of a succession of distinctive events.

A further object of the invention is to determine the presence or absence of a single and predetermined point along a character sensing cycle.

Briefly described, the present invention contemplates a pattern recognition system in which characters are recorded upon the record medium with magnetic ink. The date can then be read by passing each character successively under a reading head. The output of the reading head produces a resultant wave shape which is uniquely characteristic for each different character. The output of the reading head is passed through an amplifier and quantizer with output bit signals therefrom occurring at different times with respect to a reference starting time. The bit signals serve to gate the output of pulse generating circuitry for application to pulse width analyzing circuitry for determining the presence or absence of bit signals at predetermined times, and with the output therefrom being insertable into multi-level shift registers. The bit signals also serve to controllably gate the input to the shift registers. The outputs of the shift registers are representative of the character stored therein and are applied to a coincident circuit arrangement for encoding and subsequent utilization by automatic data-processing equipment.

The foregoing and other objects, features, and advantages of the invention will be apparent from the following more particular description of a preferred embodiment of the invention, as illustrated in the accompanying drawings.

In the drawings:

FIG. 1 is a schematic block diagram of a preferred embodiment of the invention as applied in a character recognition system.

FIGS. 2a through 2e form a schematic block diagram of the circuits of a preferred embodiment of the invention for a pulse time interval measuring system.

FIG. 3 is a diagram showing the manner in which FIGS. 2a through 2e should be joined together.

FIGS. 4a, 4b and 4c show the coincident circuit arrangements for the outputs of the shift registers and bit latches shown in FIGS. 2d and 2e to enable character encoding.

FIG. 5 is a chart showing the character recognition statements for the digital characters 0 through 9 and for special characters.

FIGS. 9a and 9b are diagrammatic showings of the font for the characters 4 and 8 to an enlarged scale and as adapted for evaluation by the pulse time interval measuring system of the instant invention.

FIG. 9c is a diagrammatic showing of the font for the characters 0 through 9 and four special characters.

Figure 10:
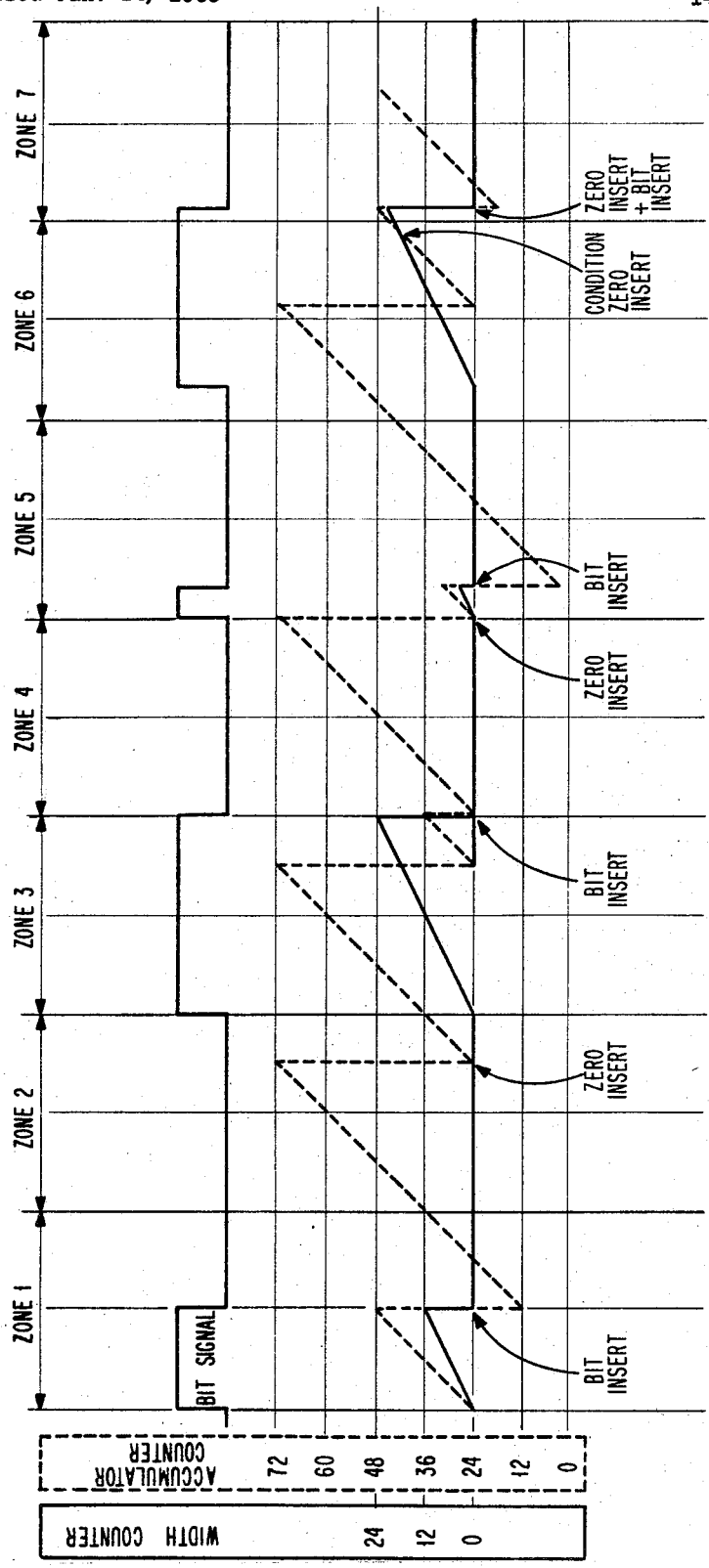

FIG. 10 is a diagrammatic representation of waveforms capable of being sensed by the pulse time interval measuring system and the control exercised by the quantitative analysis of the system of the present invention.

Figure 1:
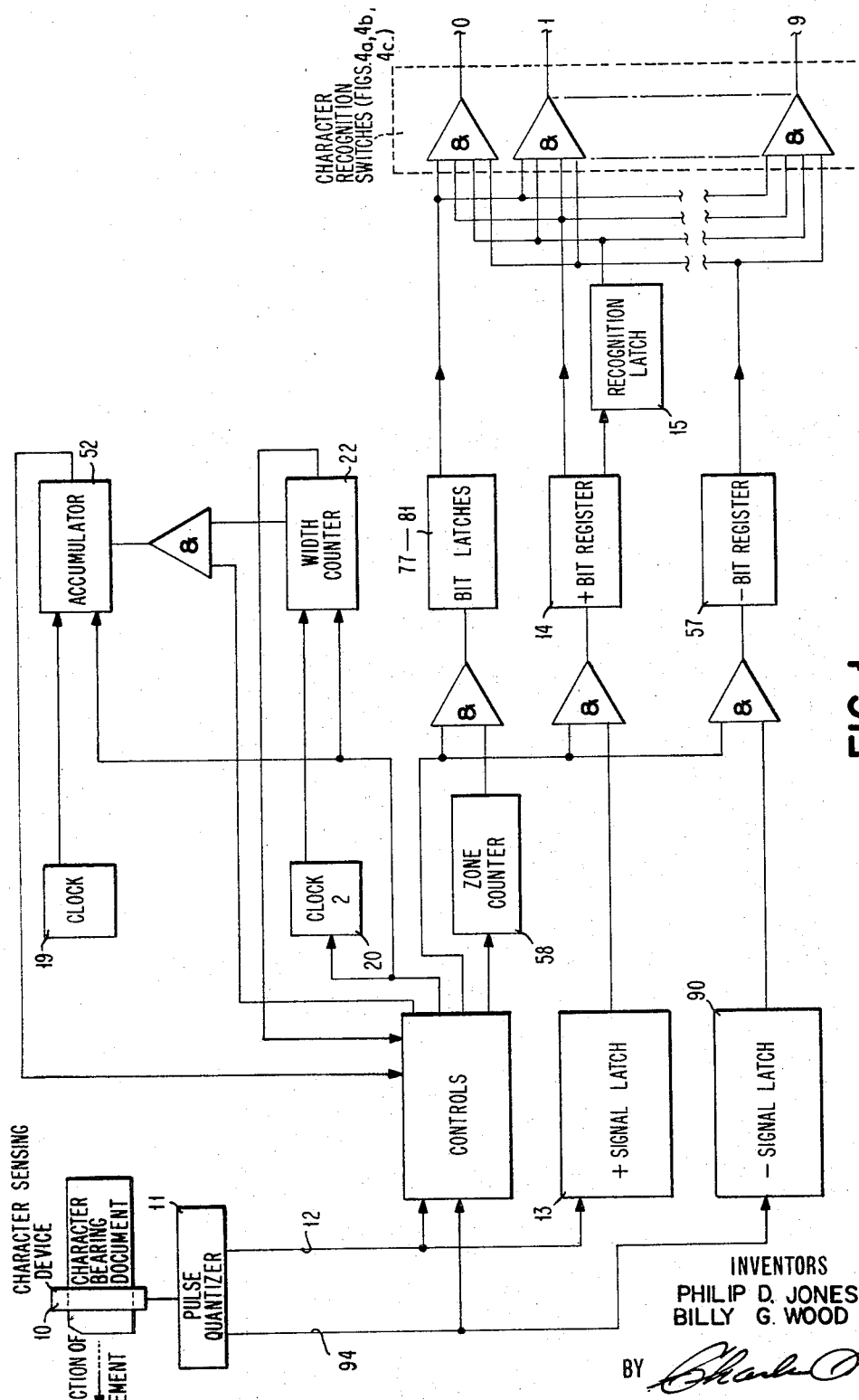

Reference is made to FIGS. 9a and 9b, which show the exemplary numbers 4 and 8 which are printed in type font in accordance with the method of this invention. The characters are recorded on a record medium with a magnetic ink. The record mediums having characters imprinted thereon are transported so that the characters will pass in sequence under a character sensing or reading device 10 (FIG. 1). The output from the reading device 10 is applied to a quantizer 11. The output from the quantizer 11 for each character is a plurality of bit signals having a wave shape which is characteristic of the character being sensed by the sensing device 10. Changes in the signal caused by the presence or absence or by the increase or decrease of magnetic ink at pre-determined zone points of a character are converted into character representing bit signals for analysis and storage by the apparatus to be described hereinafter.

With reference to FIGS. 9a and 9b it may be noted that the characters are divided vertically into a plurality of adjacent zones. Significant changes in the increase or decrease of magnetic ink occurs at or near the zone dividing lines. The changes due to an increase serve to induce a plus signal in the sensing device 10 and changes due to a decrease of magnetic ink serve to induce minus signals in the sensing device 10 (FIG. 1). Fundamentally, these plus and minus signals serve to control the pulse time interval measuring system of the instant invention, as will become more apparent as the description proceeds.

Figure 6:
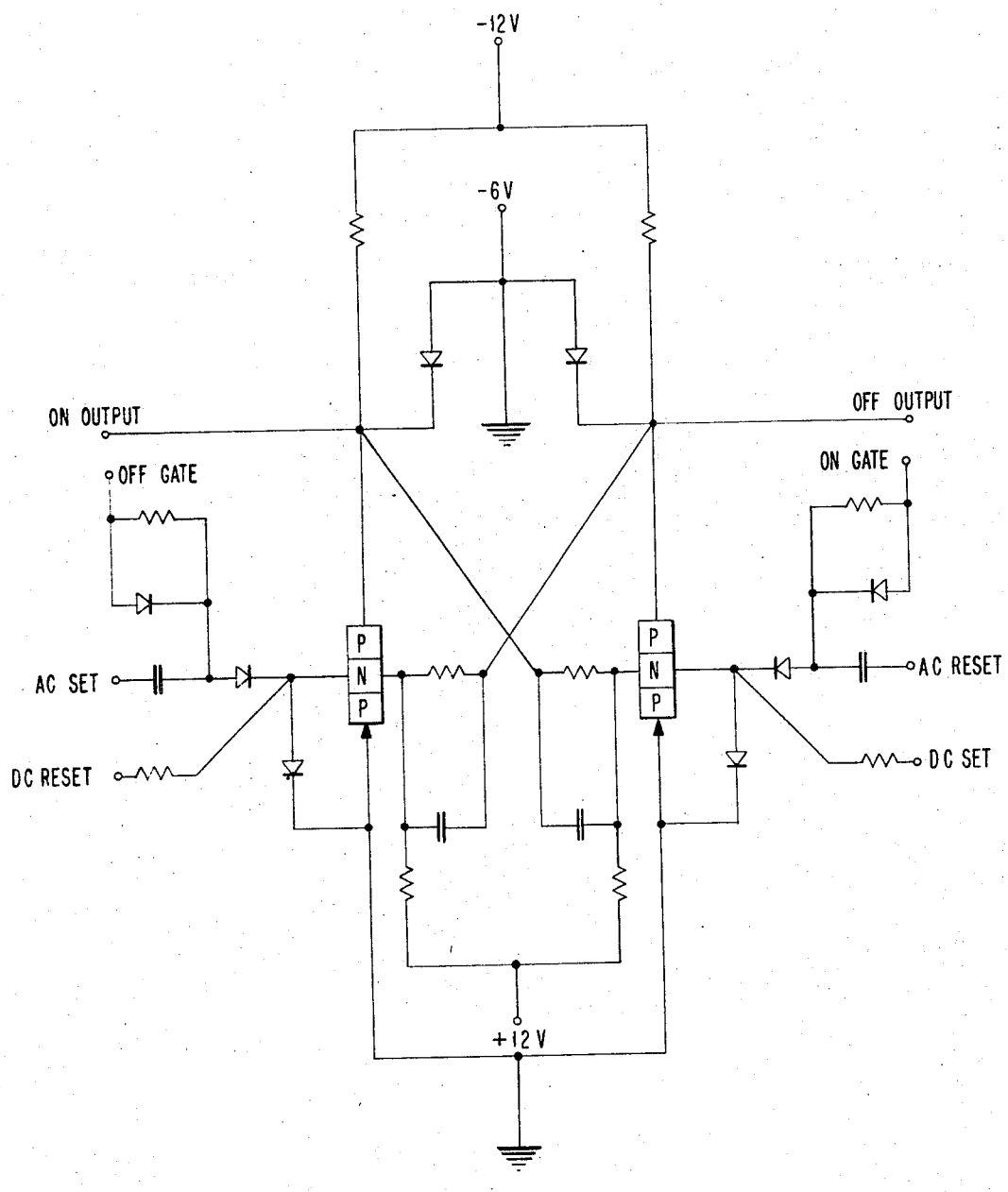
FIG. 6 is a circuit detail for a trigger circuit of the type employed in the latches shown in FIGS. 2a through 2e.

FIG. 6 shows a transistorized trigger circuit of the 'flip-flop" variety. For example, the trigger is of the type which requires the application of a gate pulse to either the "on" side or the "off" side in order for the application of the AC pulse to the "on" side or "off" side, respectively, to be effective for causing a switching action of the trigger circuit. The trigger can be set or reset by application of a DC pulse applied to the appropriate DC set or reset terminal.

Figures 7, 8:
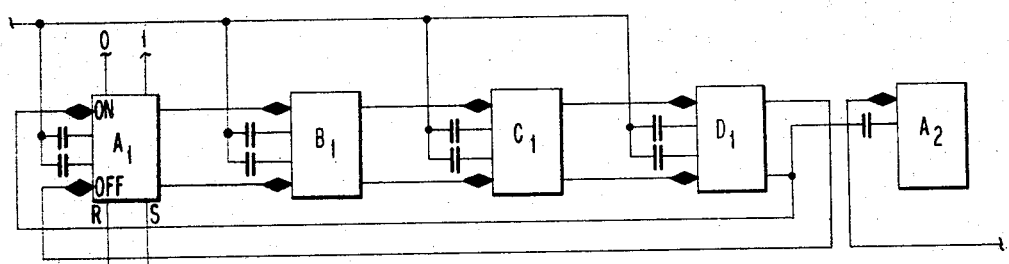
FIG. 7 is a schematic diagram of a "walking" counter of the type employed for the accumulator width counter and zone counter shown in FIGS. 2a and 2b, and 2e.
FIG. 8 is a table showing the "off" (0), "on" (1), status of the stages of the "walking" counter of FIG. 7 and the corresponding digital value representations.

In FIG. 7 there is shown a more detailed block diagram of the circuit logic for a "walking" counter of the type employed for the accumulator 52, the width counter 22, and the zone counter 58 shown in FIGS. 2a, 2b and 2e, respectively. A section of the "walking" counter comprises four bistable stages identified as A1, B1, C1, and D1. Referring to the A1 stage, it may be observed that the inputs are applied to the left side with the lines including the diamonds being indicative of a gate function. The input signal lines is capacitively coupled to the left hand edge of the stage and functions to trigger the stage to either the "on" or "off" condition depending upon which side is gated. The top edge of the A1 stage provides the "off" or "zero" output and the "on" or "one" output. The right hand side of the A1 stage at the top provides an "on" side output for gating the next succeeding or B1 stage while the bottom line provides the "off" side output which functions as a gate for the "off" side input to the B1 stage. At the bottom edge of the A1 stage are coupled the reset and set lines.

Assuming all stages to be in their "off" condition, the "off" side output from the D1 stage gates the "on" side input to the A1 stage so that the first occurring pulse on the input signal line will trigger the A1 stage from its "off" condition to its "on" condition. The "on" side output from the A1 stage is coupled to the "on" side input of the B1 stage so that the next occurring pulse on the input signal line will trigger the B1 stage to its "on" condition. This action will continue so that the C1 and the D1 stages are turned "on" and then the "on" side output from the D1 stage is coupled back as a gate to the "off" side gate for the A1 stage so that the next occurring pulse on the input signal line will trigger the A1 stage to its "off" condition. This action will continue until all stages A through D have been turned off. The D1 stage of turning off will trigger the A2 stage to its "on" condition.

FIG. 8 is a table showing the "off" and "on" status of the stages of the "walking" counter of FIG. 7 and the corresponding digital value representations.

The principal circuits of the pulse time interval measuring system are illustrated in block diagram form in FIGS. 2a through 2e. FIG. 3 shows the manner in which these views should be assembled.

Referring to FIGS. 1 and 2a through 2e, the passing of record mediums having characters printed thereon under the sensing device 10 will induce plus and minus signals in the sensing device 10 in a prescribed pattern according to the character being sensed. The leading edge of all characters will cause a plus signal to be induced in the sensing device 10. Subsequently, occurring increases and decreases in the magnetic ink of each character will cause subsequently occurring plus and minus signals, respectively. This condition and the controls effected thereby will become more fully apparent as the description proceeds.

The system herein described has the ability to distinguish between spurious or unwanted pulses, minimum width pulses, normal width pulses, double width pulses, and the absence of pulses. These bit pulses conditions are illustrated in FIG. 10. The operation of the pulse time interval measuring system will now be described to illustrate how the system functions to achieve the intended performance for each of the various pulse conditions.

ZONE 1

Referring to FIG. 10, there is shown in zone 1 a normal plus pulse output of pulse quantizer 11 occupying about one-half of the zone width and such as is automatically produced by the leading edge of a character when passing under the sensing device 10 of FIG. 1. The plus pulse output of pulse quantizer 11 (FIG. 1) and appearing on line 12 (FIG. 2d) is applied as a DC set pulse to the "on" side of plus signal latch 13. When the plus latch 13 goes "on," the output from the "on" side is applied as an "on" gate to the H stage of the plus register 14; and functions to DC set the recognition latch 15 to its "off" condition; and also functions to DC set the "on" side of the character latch 16 to an "on" condition. The plus pulse appearing on line 12 is also coupled through the OR switch 17 and applied as an "on" gate to the bit signal latch 18, and by application to to the inverter 28 inhibits the "off" gate to the bit signal latch 18.

A free-running pulse generator 19 is designed to produce clock pulses at a pre-determined frequency, which in the preferred embodiment, is equivalent to 48 pulses per zone width. These clock pulses are applied to the half-rate pulse generator 20, which functions to produce half-rate clock pulses, that is equivalent to 24 pulses per zone width.

In the system of the present invention the accumulator 52 (having upper and lower sections appearing on FIGS. 2a and 2b) is a device designed to be stepped or advanced by pulses from the clock pulse generator 19. Normally, the accumulator 52 operates between the quantitative values of 24 and 72. In other words, when the accumulator reaches a 72 count, it is then reset to the value of 24 and is again pulsed towards the count of 72. It should be pointed out that there are exceptions to this so-called operation wherein the accumulator may be reset to different values. These different resets will become apparent in conjunction with the description of examples that will follow.

With the gate applied to the "on" side of the bit signal latch 18, the next occurring clock pulse will trigger the bit signal latch 18 to the "on" condition. The "on" side output from the bit signal latch 18 is applied to the switch 21 and will gate pulses from the half-rate pulse generator 20 through the switch 21 and serve as inputs to the width counter 32. Like the accumulator 52, the width counter 22 has an upper and lower section (appearing on FIGS. 2a and 2b) and is designed to be pulsed like the accumulator 52, but at half the rate by pulses from the half-rate pulses generator 20.

Figure 2C:
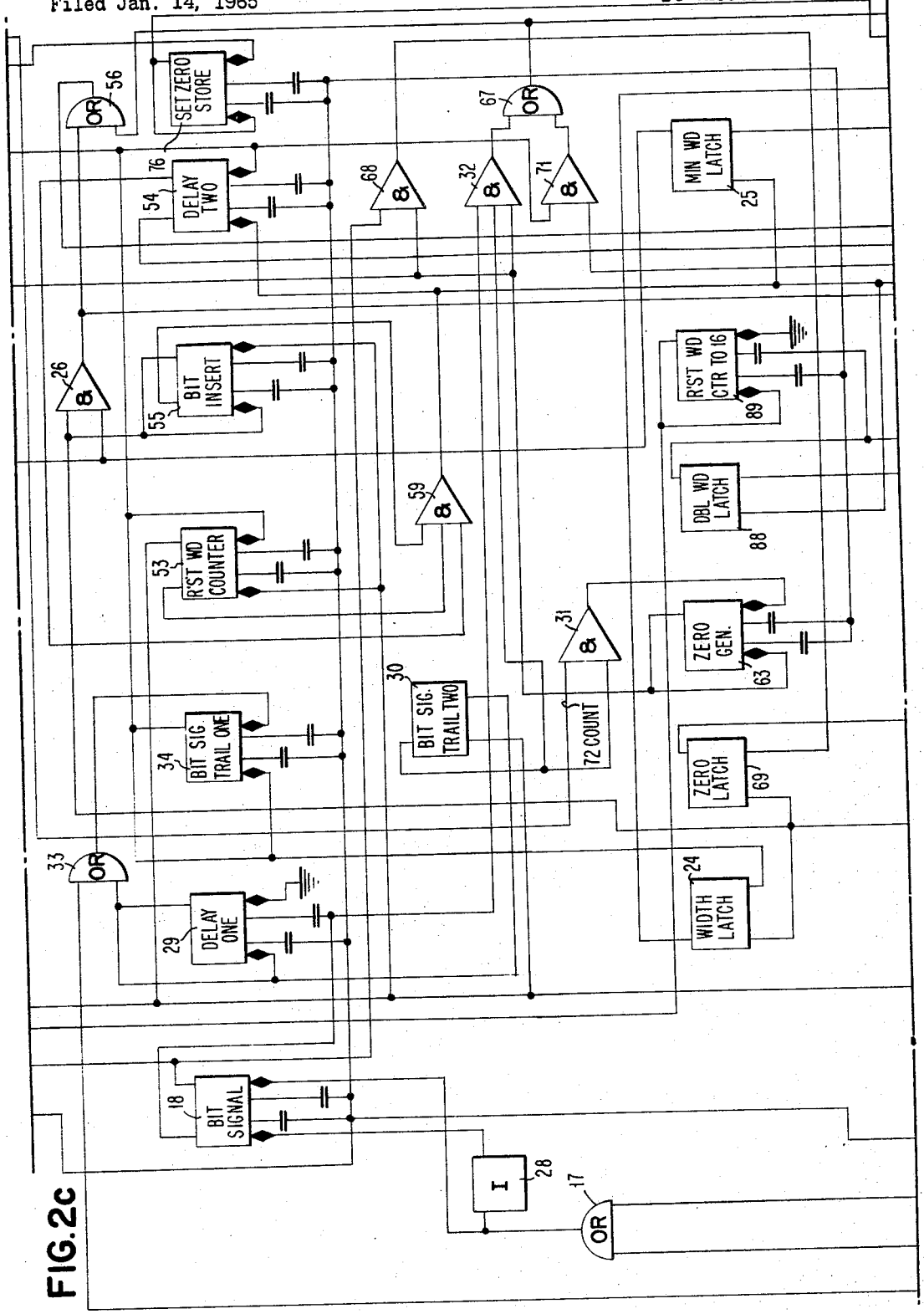

When three pulses have been applied to the width counter 22 an output from the appropriate stages and representative of the three count will be applied to the AND switch 23 (FIG. 2e) which at this time will be gated by the "off" side output of the width latch 24 (FIG. 2c). The resultant pulse from AND switch 23 will function to DC set the minimum width latch 25 to an "on" condition. The "on" side output from the minimum width latch 25 is applied to the AND switches 26 (FIG. 2c) and 27 (FIG. 2b) thereby functioning as gates.

In accordance with the example of zone 1 in FIG. 10, the bit signal ends or terminates at the midpoint of the zone and the sequence of events controlled thereby will now be described. The pulse appearing on line 12 (FIG. 2d) will dissappear and thereby cause the output from the inverter 28 to gate the "off" side of the bit signal latch 18 so that the next occurring clock pulse will trigger the bit signal latch 18 to an "off" condition. With the bit signal latch 18 in the "off" condition, switch 21 can no longer pass half-rate pulses into the width counter 22. The "off" side output from the bit signal latch 18 will trigger the delay one latch 29 to an "on" condition. The "on" side output from the delay one latch 29 will DC set the bit signal trail two latch 30 to the "on" condition. The bit signal trail two latch 30 in the "on" condition merely inhibits the switches 31 and 32. The "on" side output from the delay one latch 29 will pass through the OR switch 33 and function as a gate for the "on" side of the bit signal trail one latch 34 so that the next occurring clock pulse will trigger the bit signal trail one latch 34 to the "on" condition. The "on" signal output from the bit signal trail one latch DC sets the width latch 24 to the "on" condition thereby inhibiting the AND switches 23 and 35; and the "on" signal of bits signal trail one latch is applied to the AND switch 27 in coincidence with the "on" output from the minimum width latch 25 for application to the AND switches 36 through 51 thereby transferring the count standing in the width counter 22 to the accumulator 52. The "on" signal output from the bit signal trail one latch 34 is also applied as a gate to the "on" side of the reset width counter latch 53 and the delay two latch 54 with the next occurring clock pulse being effective to turn "on" both of the latches 53 and 54. The "on" signal output from the reset width counter latch 53 functions to reset all stages of the width counter 22 to their zero condition, or in other words reset the count to its zero value. The "on" signal output from the reset width counter latch 53 also DC sets the bit signal trail two latch 30 to the "off" condition. The "on" signal output from the reset width counter latch 53 also functions as a gate to the "on" side of the bit insert latch 55 so that the next occurring clock pulse will turn this latch to an "on" condition.

The "on" signal output from the bit insert latch 55 functions to restore the width latch 24 to the "off" condition; and is applied in coincidence to AND switch 26 with the minimum width latch 25 "on" output which results in passing a pulse to the "on" side input of stage H of the plus register 14 which triggers the stage to an "on" condition, thus storing the bit. The pulse output from the switch 26 is applied through the OR switch 56 and functions to shift the plus register 14 and the minus register 57 stage conditions one step to the right; it also pulses the zone counter 58 The "on" signal output from the bit insert latch 55 also functions to gate the "off" side of the latch 55 so that the next occurring clock pulse will turn the bit insert latch 55 to its "off" condition. Thus, it may be seen that the bit insert latch is "on" for a single clock time.

The bit insert latch 55 "off" side output is coincidently coupled to the AND switch 59 with the "off" side output of the reset width counter latch 53 and the "on" side output from the delay two latch 54. The resultant output from the AND switch 59 functions to DC set the minimum width latch 25 to the "off" condition; and gates the pulse signal latch 13 so that the next occurring clock pulse will turn it to the "off" condition; and gates the off side of the delay two latch 54 so that the next occurring clock pulse will turn the latch 54 to the "off" condition.

In summary, it has been shown how a normal zone pulse activates the width counter 22; how the bit signal pulse terminates and causes an insert of a bit into the plus register 14 and effects a transfer of the count in the width counter to the accumulator 52; and effects a shift of the plus register 14, the minus register 57; and pulses the zone counter 58.

It is convenient at this point to mention that if the pulse output from the quantizer 11 were a negative signal instead of a plus signal, a pulse condition would occur on line 94 (FIG. 2d) which would function to DC set the minus signal latch 90 to its "on" condition. The "on" side output from the minus signal latch 90 serves as an "on" gate for the H stage of the minus register 57. Otherwise the sequence of events as explained above for turning "on" the bit signal latch 18, etc. is the same as described above for the plus signal appearing on line 12. Thus, at the termination of the negative or minus bit signal on line 94 the minus bit signal condition will be stored in the H stage of the minus register 57 rather than in the H stage of the plus register 14, as described above.

ZONE 2

It will now be shown how an absence of a bit signal pulse in zone 2 (FIG. 10 effects a zero insert into the plus register 14 and the minus register 57. As previously disclosed, accumulator 52 is adapted to be pulsed by clock pulse outputs from the clock pulse generator 19 and operating normally between the limits of a 24 count and 72 count. When the pulse count stored in the accumulator 52 reaches a quantity of 72, the coincident outputs from the "on" side of the A2 stage and the "on" side of the E stage will be coincidently applied to the AND switch 60 (FIG. 2b) with the resultant pulse from the AND switch 60 being applied through the inverter 61 and inhibiting the AND switch 62; and is also applied to the AND switch 31 (FIG. 2c) in coincidence with the "off" signal output from the bit signal trail two latch 30. The resultant output pulse from AND switch 31 is applied as a gate to the "on" side of the zero gen latch 63 so that the next occurring clock pulse will turn the zero gen latch 63 to the "on" condition. The "on" signal output from the zero gen latch 63 is applied to the OR switches 64, 65 and 66 (FIG. 2b) to reset the quantity in the accumulator 52 to a value of 24. The "on" signal output from the zero gen latch 63 is coincidently applied to the AND switch 32 with the "off" signal output of the bit signal latch 18 and the "off" signal output of the bit signal trail two latch 30. The resultant pulse output from the AND switch 32 is passed through the OR switch 67 and functions to DC set the "off" side of the H stages of both the plus register 14 and the minus register 57 thereby effecting a zero insert into both registers. The pulse output from the OR switch 67 is passed through the OR switch 56 and functions to shift the plus register 14 and the minus register 57 stage conditions one step to the right; it also pulses the zone counter 58.

In summary, it has been shown how in the absence of a bit signal pulse, a zero condition has been inserted into both the plus signal register 14 and the minus signal register 57 accompanied by a shift within the registers.

ZONE 3

Referring to the illustration in zone 3 of FIG. 10, there is shown a bit signal which extends for the full width of the zone. The accumulator 52 count is advancing towards its upper limit of 72. At the beginning of zone 3, the bit signal will cause a pulse condition to occur on line 12 (FIG. 2d) causing the plus signal latch 13 to DC set to its "on" condition; and for gating via the OR switch 17 the "on" side of the bit signal latch 18. The next occurring clock pulse will turn the bit signal latch 18 to its "on" condition thereby providing a gate to AND switch 21 to permit half-rate pulses from the half-rate generator 20 to be inserted into the width counter 22. When the accumulator 52 reaches its upper quantitative limit of 72 there will be a coincident pulse condition applied to AND switch 60. The resultant pulse output from AND switch 60 will be coincidently applied to switch 31 with the "off" side output of the bit signal trail two latch 30. AND switch 31 will pass a pulse that will be applied as a gate to the zero gen latch 63. The next occurring clock pulse will trigger the zero gen latch 63 to its "on" condition with the "on" side output therefrom being applied to the OR switches 64, 65 and 66 (FIG. 2b) and effective to reset the accumulator 52 to a quantitative value of 24; and upon being applied coincidently to AND switch 68 with the "on" side output from the bit signal latch 18 will pass a pulse through AND switch 68 that serves to DC set the zero latch 69 to its "on" condition. The "on" side output from the zero latch 69 will serve as a gate for the zero store latch 70. The next occurring clock pulse will trigger the zero store latch 70 to its "on" condition with the resultant output from the "on" side being applied to AND switch 71. However, AND switch 71 is ineffective at this time because the bit signal trail one latch 34 remains in the "off" condition.

At the end of zone 3 of FIG. 10, the bit signal pulse will terminate causing the pulse signal on line 12 (FIG. 2d) to disappear. The absence of the pulse on line 12 will release inverter 28 thereby causing the "off" side of the bit signal latch 18 to be gated so that the next occurring clock pulse will turn the bit signal latch 18 to its "off" condition.

This will initiate the bit insert sequence of control, as described in detail for the illustration in zone 1, which briefly is as follows. The bit signal latch 18 in turning "off" triggers the delay one latch 29 to the "on" condition. The delay one latch 29 remains "on" for one clock pulse time but in going "on," its DC sets the bit signal trail two latch 30 to the "on" condition thereby inhibiting the AND switches 31 and 32; and gates the bit signal trail one latch 34 for triggering "on" by the next occurring clock pulse. The bit signal trail one latch 34 remains "on" for one clock pulse time but in going "on," it DC sets the width latch 24 to its "on" condition; transfers the width counter 22 quantitative count to the accumulator 52; gates the reset width counter latch 53 and the delay two latch 54 for triggering by the next clock time pulse. The reset width counter latch 53 in going "on" resets the width counter 22 to a zero value and gates the bit insert latch 55 for triggering to an "on" condition by the next occurring clock pulse. The bit insert latch 55 in turning "on" causes the bit insert via AND switch 26 into the H stage of the pulse register 14; and via OR switch 56 causes a shift of the plus register 14, the minus register 57 and pulses the zone counter 58.

In summary, it has been shown how a bit insert operation has been effected when there is a double width pulse occurring in a given zone.

ZONE 4

Referring to FIG. 10, there is again shown in zone 4 the absence of a bit signal condition. We will now show how the absence of a signal effects a zero insert operation.

In the manner described for a illustration of zone 2, the accumulator 52 will run until its quantitative count reaches 72 wherein a coincident condition will occur at AND switch 60 causing a pulse to pass therethrough and be coincidently applied to AND switch 31 with the "off" output from the bit signal trail two latch 30. The resultant pulse output from switch 31 gates the zero gen latch 63 for triggering to its "on" condition by the next occurring clock pulse. The zero gen latch 63 in the "on" condition will reset the accumulator 52 to a quantitative value of 24; and via AND switch 32 and OR switch 67 will cause a zero insert into the H stages of the plus register 14 and the minus register 57, and via the OR switch 56 will effect a register shift of plus register 14 and minus register 57 and pulse the zone counter 58.

It has again been shown how the zero insert operation has been effected for the absence of a bit signal condition as appearing in zone 4.

ZONE 5

There is shown in zone 5 of FIG. 10 a bit signal having a minimum duration sufficient to render the pulse time measuring system of the instant invention operative. Again a bit signal appearing on line 12 will gate the bit signal latch 18 for triggering by the next occurring clock pulse to its "on" condition. The bit signal latch 18 in the "on" condition will gate switch 21 so that half-rate clock pulses from the half-rate pulse generator 20 are inserted into the width counter 22. If the width counter 22 is not operative for at least three pulse counts it will be ineffective in turning the minimum width latch 25 (FIG. 2c) to its "on" condition via the AND switch 23 (FIG. 2e), thus the sequence of control events at the end of the bit signal are not initiated. When the quantitative count in the width counter 22 reaches a value of 3, a pulse will be applied to the AND switch 23 in coincidence with the "off" side output from the width latch 24. The resultant pulse output from the AND switch 23 will DC set the minimum width latch to its "on" condition. When the bit signal terminates, the absence of the pulse from line 12 will cause the "off" side of the bit signal latch 18 to be gated so that the next occurring clock pulse will trigger the bit signal latch 18 in its "off" condition. Here again the sequence of control events will be initiated and operative in the same manner as described for the illustration in zone 1 to effect a bit insert into the plus register 14 followed by a shift of the plus register 14 and the minus register 57 along with a pulsing of the zone counter 58. The bit insert and register shift functions are caused by the bit insert latch 55 being triggered to its "on" condition.

ZONE 6

There is shown in zone 6 a bit signal pulse of nearly full zone duration and extending slightly into zone 7. With reference to FIG. 10. it may be noted that the accumulator 52 count is advancing towards its 72 value. The leading edge of the bit signal pulse will cause the bit latch 18 to be turned "on" in the same manner as previously described and whereby half-rate clock pulses will be introduced into the width counter 22. When the accumulator 52 reaches a value of 72 the coincident pulse application to the AND switch 60 will cause a resultant pulse to be applied to the AND switch 31 in coincidence with the "off" side output from the bit signal trail two latch 30. The resultant pulse output from AND switch 31 will gate the zero gen latch 63 so that the next occurring clock pulse will trigger the zero gen latch 63 to its "on" condition. The "on" side output from the zero gen latch 63 will reset the accumulator 52 to a quantitative value of 24; and will be applied to the AND switch 68 in conicidence with the "on" side output from the bit signal latch 18. A resultant pulse output from the AND switch 68 will DC set the zero latch 69 to its "on" condition. The "on" side output from the zero latch 69 will gate the "on" side of the zero store latch 70. With the accumulator 52 advancing at twice the rate of the width counter 22, there is a point where the count in the accumulator 52 and the width counter 22 will be equal. The condition of the coincidence in the lower half of the width counter 22 and the accumulator 52 are tested by the AND switches 72 and the OR switches 73 for application to the count compare AND switch 62. Similarly, the coincident condition of the stages in the upper half of the width counter 22 and the accumulator 52 are tested by the AND switches 74 and the OR switches 75 for application to the count compare AND switch 62. With coincident inputs to the count compare AND switch 62, there will be a resultant output pulse which is applied as the gate to the "on" side of the "set zero store" latch 76 so that the next occurring clock pulse will trigger the "set zero store" latch 76 to its "on" condition. The "on" side output from the "set zero store" latch 76 will trigger the "on" side of the zero store latch 70 which was previously gated by the operation when the accumulator 52 reached a value of 72. The "on" side output from the zero store latch 70 is applied to the AND switch 71 as a gate.

When the bit signal pulse terminates, the absence of the pulse from line 12 will gate the bit signal latch 18 for triggering to its "off" condition by the next occurring clock pulse in the same manner previously described. The triggering "off" of the bit signal latch 18 will cause the delay one latch 29 to be triggered "on" which in turn will gate the bit signal trail one latch 34 for triggering to its "on" condition. The bit signal trail one latch 34 in its "on" condition will trigger the width latch 24 "off," thereby inhibiting the AND switches 23 and 35; and will be applied to the AND switch 27 (FIG. 2b) for the purpose of transferring the count in the width counter 22 to the accumulator 52; and applied in coincidence with the "on" side output from the zero store latch 70 to the AND switch 71 will effect a zero insert into the plus register 14 and the minus register 57 and also pulse the zone counter 58. The bit signal trail one latch 34 will gate the reset width counter latch 53 and the delay two latch 54 so that they may be triggered to their "on" condition by the next occurring clock pulse. The "on" side output from the reset width counter latch 53 will reset the width counter 22 to its zero value and gate the bit insert latch 55 so that the next occurring clock pulse will trigger the latch to its "on" condition. The bit insert latch 55 "on" side output applied through the AND switch 26 in coincidence with the "on" side output from the minimum width latch 25 will produce a resultant pulse that causes a bit insert into the H stage of the plus register 14 and also causes the shift of the plus register 14 and the minus register 57 as well as pulsing the zone counter 58. The "on" side output from the bit insert latch 55 will also DC set the zero latch 69 to its "off" condition and trigger the zero store latch 70 to its "off" condition. The bit insert latch 55 has an "on" time duration of one clock pulse and when restored to its normally "off" condition, the "off" side output is applied to the AND switch 59 and will be in coincidence with the "off" side output from the reset width counter latch 53 and the "on" side output of the delay two latch 54 thereby causing a resultant pulse from the AND switch 59. This resultant pulse from the AND switch 59 is effective to reset the minimum width latch 25 to its "off" condition and to gate the delay two "off" side for triggering by the next occurring clock pulse; and for triggering the pulse signal latch 13 to its "off" condition.

In summary, it has been shown how an accumulator reset was effected and a zero insert condition was generated by a count compare between the counter 22 and the accumulator 52 so that at the bit signal pulse termination a zero insert into both H stages of the registers 14 and 57 was effected and in turn followed by a bit insert into H stages of the registers.

In conjunction with the example of zone 6 in FIG. 10 it should be pointed out that if the bit signal pulse had terminated before the count compare had occurred, as in zone 3, FIG. 10, only a bit insert operation would have been effected as the zero latch 69 and the zero store latch 70 would have been reset to the "off" condition prior to the count compare. In other words, if the accumulator reset occurs prior to the mid-point of the bit signal pulse it is desired that both a zero insert and a bit insert operation be effected, but if the accumulator reset occurs after the mid-point of the bit signal pulse then a bit insert only operation is desired.

*Bit latches*

The character latches 77 through 81 (FIG. 2e) are utilized to store bit signal resolutions of character representing waveforms having similarity with the bit signals of other character representing waveforms in certain predetermined zone positions. The manner in which these bit signals are determined, and entered into storage in the latches 77 through 81 and the controls affected thereby will now be described.

The zone counter 58 is a walking type counter which is adapted to be advanced on the occasion of each register shift pulse as an output from the OR switch 56. The outputs from the stages of the zone counter 58 serve as gates to partially control the gating of the AND switches 82 through 86. During the description for the bit signal conditions of the illustration for zone 6, it was pointed out that when an accumulator reset occurred prior to the mid-point of the bit signal pulse and was followed by a count compare condition, that the zero store latch 70 would be turned to an "on" condition so that after the termination the bit signal, both a zero insert and a bit insert were entered into the plus signal register 14 and the minus register 57. However, under certain conditions a zero insert operation is not desired. For example, whenever the bit signal occurring in the first zone position may have a bit signal duration greater than the full zone width, the width counter 22 upon arriving at a quantitative value of 24 will cause an output which is applied to the AND switch 35 in coincidence with the "off" side output from the width latch 24. Since at the start of the bit signal the zone counter 58 was reset to zero, the outputs from the "off" side of the A and D stages of the zone counter 58 representing a zero count will be coincidently apppplied to the AND switch 82 with the resultant pulse output from the AND switch 35. The resultant pulse output from the AND switch 82 will serve to trigger the "one latch" 77 to its "on" condition and will pass through the OR switch 87 serving to DC set the double width latch 88 (FIG. 2c) to its "on" condition. The double width latch 88 in its "on" condition will trigger the "reset width counter to 16" latch 89 to its "on" condition which remains "on" for a duration of one clock pulse time. The "on" side output from the reset width counter latch 89 will function to reset the width counter 22 to a quantitative value of 16. The "on" side output from the double width latch 88 will also serve to DC set the zero store latch 70 to its "off" condition so that when the bit signal in the first zone terminates, a bit insert operation will be effected but the zero insert condition as previously conditioned will now be ineffective.

Similarly, whenever a bit signal occurring in the zone 2 position has a bit signal of greater duration than the width counter 22 applied to the AND switch 35 will cause a resultant output pulse to be applied to the AND switch 83 in coincidence with the quantitative count output of 1 from the zone counter 58 thereby turning the "2 latch" 78 to its "on" condition and with the pulse passed by the OR switch 87 being effective to render a zero insert sequence inoperative as described above.

Similarly, the AND switch 84 functions in response to a negative or minus signal in the fourth zone position having a duration gerater than a full zone width and following an insert into the plus register 14 for the first zone position, a zero insert into both the plus register 14 and the minus register 57 for the second zone position, and a plus bit insert into the plus register 14 for the third zone position, with the resultant outputs from the F, G and H stages of the plus register 14 and the G stage of the minus register 57 being applied to the AND switch 84 in coincidence with the 24 quantitative value count pulse from the width counter 22 via AND switch 35, the minus bit signal from the minus signal latch 90, and the outputs of the zone counter 58 representative of the counter in its fourth position. Thus the termination of the negative bit signal in the fourth zone position will cause a bit signal only to be introduced into the minus register 57.

Similarly, the "6 latch" 80 and the "7 latch" 81 function in response to negative bit signal conditions occurring in the 6th and 7th zone positions when pre-determined bit signal combinations have been introduced into the plus register 14 and the minus register 57 from the earlier zone positions.

Recapitulating, it has been shown how bit signal pulses have been measured with respect to time to effect bit inserts into the plus register 14 and the minus register 57 and the resolving of ambiguous conditions with the resultant inserts into the 1, 2, 4, 6, and 7 latches 77 through 81 when appropirate.

Storage register readout

Figure 4B:
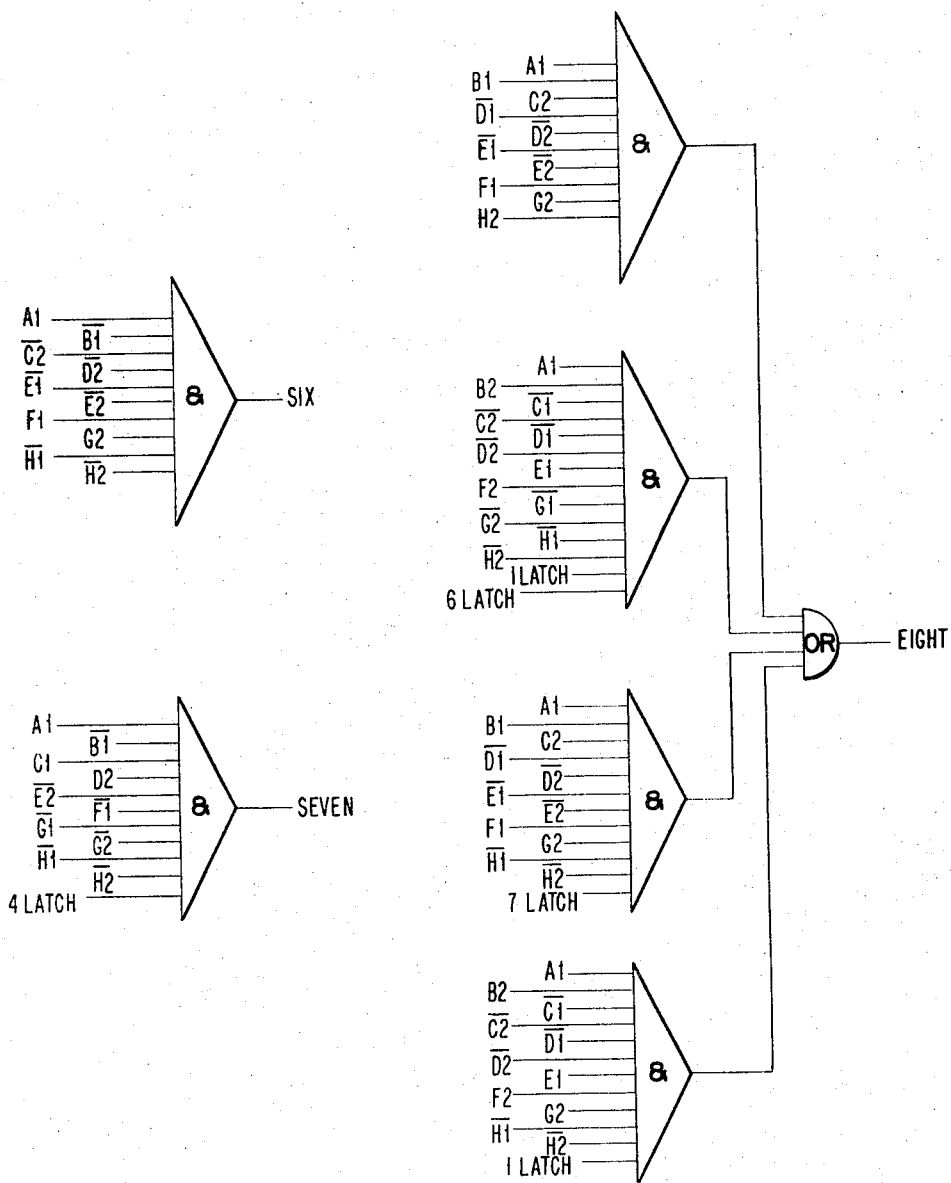
Figure 4C:
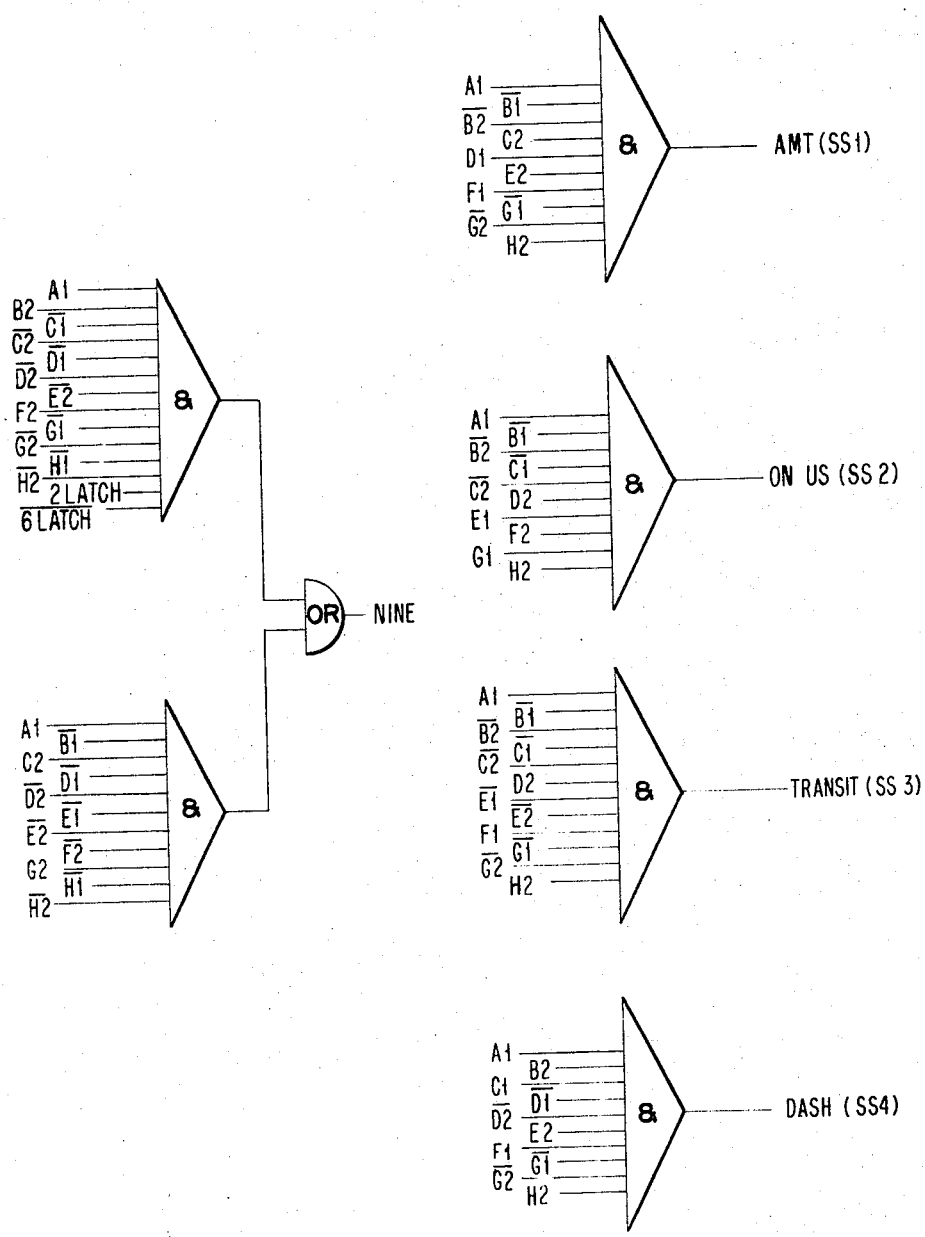

A single character sensing operation is terminated when the first plus bit signal occurring in zone 1 and entered into the H stage of the plus register 14 has been shifted step by step to the A stage of the register thereby turning the A stage to its "on" condition. The coincidence pulse input to the AND switch 59 following the register shift which turns the A stage of the plus register 14 to its "on" condition will cause a resultant output pulse from the AND switch 59 which is applied in coincidence to the AND switch 91 with the "on" side output from the A stage of the plus register 14. The resultant pulse output from the AND switch 91 DC sets the recognition latch 15 to its "on" condition. The "on" side output from the recognition latch 15 serves as a gate to the AND switch 92 and is applied via the OR switch 33 (FIG. 2c) as a gate to the bit signal trail one latch 34 so that the next occurring clock pulse will trigger the bit signal trail one latch 34 to its "on" condition. The "on" side output from the bit signal trail one latch 34 gates the reset width counter 53 so that the next occurring clock pulse will trigger latch 53 to its "on" condition. The "on" side output from the reset width counter latch 53 is applied in coincidence with the recognition latch 15 "on" side output to the AND switch 92. The resultant pulse output from the AND switch 92 is applied as an input to each of the character recognition AND switches appearing in FIGS. 4a, 4b, and 4c. Wherever a coincident input condition exists in any of the AND switches occurring on FIGS. 4a through 4c, there will be a resultant pulse output representative of the character sensed by the character sensing device 10 of FIG. 1 and adapted for transfer to utilization means. Thus, a character representing pulse has been read out of the plus register 14, minus register 57 and the latches 77 through 81.

There has now been described a novel and useful arrangement of circuitry which enables the sensing of character data that has been recorded on record mediums with magnetic ink. While the width counter 22 and the accumulator 52 have been arbitrarily adapted to operate in the manner described, it may be pointed out that other arbitrary counting arrangements could be made to work equally as well without the departing from the spirit of the invention.

While the invention has been particularly shown and described with reference to a preferred embodiment thereof, it will be understood that by those skilled in the art that the foregoing and other changes in form and details may be made therein without departing from the spirit and scope of the invention.

What is claimed is:
1. A pulse time interval measuring system comprising:
 (a) means (10) for sensing characters recorded upon a document,
 (b) pulse quantizing means (11) coupled with said sensing means (10) and adapted to provide a pattern of signal representing pulses of plus and minus polarity in response to the passing of a character under said sensing means (10), the pattern of pulses being different for each different character to be sensed,
 (c) storage means (14 and 57) having a first level (14) including a plurality of stages for storing signal representing pulses of one polarity and a second level (57) including a plurality of stages for storing signal representing pulses of the opposite polarity,
 (d) gating means (gater inputs to 14 and 57) coupled with the inputs to the first and second levels of said storage means (14 and 57), said gating means being normally closed,
 (e) bit signal generating means (55) coupled with said gating means (d),
 (f) zero signal generating means (63) coupled with the inputs to the first and second levels of said storage means (14 and 57),
 (g) timing means (19 and 52) coupled with said zero signal generating means (63) for conditioning the same after a predetermined period of time has elapsed,
 (h) control means (13 and 90) coupled with said pulse quantizing means (11) and responsive to the presence of signal representing pulses for opening said gating means (d), and
 (i) second control means (18) coupled with said pulse quantizing means (11) and with said bit signal (55) and said zero signal (63) generating means and responsive to the presence of signal representing pulses for controllably operating said bit signal generating means (55) so as to enter bit representing signal conditions into selective positions of said storage means (14 and 57), and responsive to the absence of signal representing pulses for controllably operating said zero generating means (63) so as to enter zero representing signal conditions into selective positions of both levels of said storage means (14 and 57).

2. A pulse time interval measuring system as recited in claim 1 including character evaluation switching means (82–86) coupled with the outputs of the storage positions of said storage means (14 and 57).

3. A pulse time interval measuring system comprising:
 (a) means (10) for sensing characters recorded upon a document,
 (b) pulse quantizing means (11) coupled with said sensing means (10) and adapted to provide a pattern of signal representing pulses of plus and minus polarity in response to the passing of a character under said sensing means (10), the pattern of pulses being different for each different character to be sensed,
 (c) storage means (14 and 57) having a first level (14) including a plurality of stages for storing signal representing pulses of one polarity and a second level (57) including a plurality of stages for storing signal representing pulses of the opposite polarity,
 (d) gating means coupled with the inputs to the first and second levels of said storage means (14 and 57), said gating means being normally closed,
 (e) bit signal generating means (55) coupled with said gating means (d), (f) zero signal generating means (63) coupled with the inputs to the first and second levels of said storage means (14 and 57), (g) a pulse generator (19) capable of producing pulses at a predetermined frequency, (h) count accumulating means (52) coupled with said pulse generator (19) and with said zero signal generating means (63) for conditioning same after a predetermined count has been entered into said count accumulating means (52), (i) control means (13 and 90) coupled with said pulse quantizing means (11) and responsive to the presence of signal representing pulses for opening said gating means (d), and (j) second control means (18) coupled with said pulse quantizing means and with said bit signal (55) and said zero signal (63) generating means and responsive to the presence of signal representing pulses for controllably operating said bit signal generating means (55) so as to enter bit representing signal conditions into selective positions of said storage means (14 and 57), and responsive to the absence of signal representing pulses for controllably operating said zero generating means (63) so as to enter zero representing signal conditions into selective positions of both levels of said storage means (14 and 57).

4. A pulse time interval measuring system as recited in claim 3 including character evaluation switching means (82–86) coupled with the outputs of the storage positions of said storage means (14 and 57).

5. A pulse time interval measuring system comprising:
(a) means (10) for sensing characters recorded upon a document, (b) pulse quantizing means (11) coupled with said sensing means (10) and adapted to provide a pattern of signal representing pulses of plus and minus polarity in response to the passing of a character under said sensing means (10), the pattern of pulses being different for each different character to be sensed, (c) storage means (14 and 57) having a first level (14) including a plurality of stages for storing signal representing pulses of one polarity and a second level (57) including a plurality of stages for storing signal representing pulses of the opposite polarity, (d) gating means coupled with the inputs to the first and second levels of said storage means (14 and 57), said gating means being normally closed, (e) bit signal generating means (55) coupled with said gating means (d), (f) zero signal generating means (63) coupled with the inputs to the first and second levels of said storage means (14 and 57), (g) a pulse generator (19) capable of producing pulses at a predetermined frequency, (h) count accumulating means (52) coupled with said pulse generator (19) and with said zero signal generating means (63) for conditioning same after a predetermined count has been entered into said count accumulating means (52), (i) control means (13 and 90) coupled with said pulse quantizing means (11) and responsive to the presence of signal representing pulses for opening said gating means (d), (j) second control means (18) coupled with said pulse quantizing means and with said bit signal (55) and said zero signal (63) generating means and responsive to the presence of signal representing pulses for controllably operating said bit signal generating means (55) so as to enter bit representing signal conditions into selective positions of said storage means (14 and 57), and responsive to the absence of signal representing pulses for controllably operating said zero generating means (63) so as to enter zero representing signal conditions into selective positions of both levels of said storage means (14 and 57), and (k) shift means (56) coupled with said second control means (18) and with said storage means (14 and 57) and operative after signal entering operations so as to shift all signal representing conditions one storage position.

6. A pulse time interval measuring system as recited in claim 5 including character evaluation switching means (82–86) coupled with the outputs of the storage positions of said storage means (14 and 57).

7. A pulse time interval measuring system comprising:
(a) means (10) for sensing characters recorded upon a document, (b) pulse quantizing means (11) coupled with said sensing means (10) and adapted to provide a pattern of signal representing pulses of plus and minus polarity in response to the passing of a character under said sensing means (10), the pattern of pulses being different for each different character to be sensed, (c) storage means (14 and 57) having a first level (14) including a plurality of stages for storing signal representing pulses of one polarity and a second level (57) including a plurality of stages for storing signal representing pulses of the opposite polarity, (d) gating means coupled with the inputs to the first and second levels of said storage means (14 and 57), said gating means being normally closed, (e) bit signal generating means (55) coupled with said gating means (d), (f) zero signal generating means (63) coupled with the inputs to the first and second levels of said storage means (14 and 57), (g) a pulse generator (19) capable of producing pulses at a predetermined frequency, (h) count accumulating means (52) coupled with said pulse generator (19) and with said zero signal generating means (63) for conditioning same after a predetermined count has been entered into said count accumulating means (52), (i) control means (13 and 90) coupled with said pulse quantizing means (11) and responsive to the presence of signal representing pulses for opening said gating means (d), (j) second control means (18) coupled with said pulse quantizing means and with said bit signal (55) and said zero signal (63) generating means and responsive to the presence of signal representing pulses for controllably operating said bit signal generating means (55) so as to enter bit representing signal conditions into selective positions of said storage means (14 and 57), and responsive to the absence of signal representing pulses for controllably operating said zero generating means (63) so as to enter zero representing signal conditions into selective positions of both levels of said storage means (14 and 57), (k) shift means (56) coupled with said second control means (18) and with said storage means (14 and 57) and operative after signal entering operations so as to shift all signal representing conditions one storage position, (l) a second pulse generator (20) capable of producing pulses at half the frequency of said first pulse generator (19), (m) a second count accumulating means (22) coupled with said second pulse generator means (20) and controlled by said second control means (18) to render the second count accumulator (22) operative during the presence of a signal representing pulse from said pulse quantizing means (11), (n) a second storage means (77–81), (o) a zone counter (58) coupled with said shift means (k) and adapted to be shifted in response to pulses therefrom, and (p) gating means (82–86) coupled with said second storage means and controlled by said zone counter (58) for selective operation with predetermined count outputs from said second count accumulator means (22) and functioning to resolve ambiguous conditions of bit signal resolutions of character representing waveforms having similarity with other character representing waveforms in certain predetermined zone positions.

8. A pulse time interval measuring system as recited in claim 7 including character evaluation switching means (82–86) coupled with the outputs of the storage positions of said first and second storage means (14 and 57).

9. A pulse time interval measuring system comprising:
(a) a document having a plurality of characters recorded thereon,
(b) a sensing means (10),
(c) means to move to said document relative to said sensing means (10),
(d) pulse quantizing means (11) coupled with said sensing means (10) and adapted to provide a pattern of signal representing pulses of plus and minus polarity in response to the passing of a character by said sensing means (10), the pattern of pulses being different for each different character to be sensed,
(e) first level storage means (14) including a plurality of stages for storing bit representing pulses of a positive polarity,
(f) second level storage means (57) including a plurality of stages for storing bit representing pulses of a negative polarity,
(g) positive signal gating means coupled with the input of said first level storage means (14), said gating means being normally closed,
(h) negative signal gating means coupled with the input of said second level storage means (57), said gating means being normally closed,
(i) a positive signal control means (13) coupled with said pulse quantizing means (11) and responsive to bit representing pulses of positive polarity for opening said positive signal gating means (9),
(j) a negative signal control means (90) coupled with said pulse quantizing means (11) and responsive to bit representing pulses of negative polarity for opening said negative gating means (h),
(k) bit signal generating means (55) coupled with said positive and negative signal gating means (g and h),
(l) zero signal generating means (63) coupled with the inputs to said first and second level storage means (14 and 57),
(m) a pulse generator (19) capable of producing pulses at a predetermined frequency,
(n) count accumulating means (52) coupled with said pulse generator (19) and with said zero signal generating means (63) for conditioning same after a predetermined count has been entered into said count accumulating means (52),
(o) control means (18) coupled with said pulse quantizing means (11) and with said bit signal and said zero signal generating means (55 and 63) and responsive to the presence of signal representing pulses for controllably operating said bit signal generating means (55) so as to enter bit representing signal conditions into selective positions of said first level or said second level storage means (14 and 57) depending upon the polarity of the signal representing pulse from said pulse quantizing means (11), and responsive to the absence of signal representing pulses for controllably operating said zero generating means (63) so as to enter zero representing signal conditions into selective positions of both levels of said storage means (14 and 57),
(p) shift means (56) coupled with said control means (18) and with said first and second level storage means (14 and 57) and operative after signal entering operations so as to shift all signal representing conditions through a single storage position,
(q) a second pulse generator (20) capable of producing pulses at half the frequency of said first pulse generator (19),
(r) a second count accumulating means (22) coupled with said second pulse generator means (20) and controlled by said control means (18) to render the second count accumulator (22) operative during the presence of signal representing pulses from said pulse quantizing means (11),
(s) a third level storage means (77–81),
(t) a zone counter (58) coupled said shift means (56) and adapted to be shifted in response to pulses therefrom, and
(u) gating means (82–86) coupled with said third level storage means (s) and controlled by said zone counter (58) for selective operation with predetermined count outputs from said second count accumulator means (22) and functioning to resolve ambiguous conditions of bit signal resolutions of character representing waveforms having similarity with other character representing waveforms in certain predetermined zone positions.

10. A pulse time interval measuring system as recited in claim 9 including coincidence switching character evaluation means (82–86) coupled with the outputs of said first, second and third level storage means (14, 57 and 77–81).

References Cited

UNITED STATES PATENTS

| | | | |
|---|---|---|---|
| 3,177,469 | 4/1965 | Chow | 340—146.3 |
| 3,278,900 | 10/1966 | Wood | 340—146.3 |
| 2,889,535 | 6/1959 | Rochester | 340—146.3 |
| 2,985,828 | 5/1961 | Mason | 340—146.3 |
| 3,140,466 | 7/1964 | Greanias | 340—146.3 |

MAYNARD R. WILBUR, *Primary Examiner.*

J. SHERIDAN, *Assistant Examiner.*